May 23, 1967    M. B. LEVITT    3,321,705
EXTERNAL ROTOR GYRO MOTOR SPEED DETECTOR
Filed Nov. 21, 1963

INVENTOR.
BY MYRON B. LEVITT
ATTORNEY.

United States Patent Office 3,321,705
Patented May 23, 1967

3,321,705
EXTERNAL ROTOR GYRO MOTOR SPEED DETECTOR
Myron B. Levitt, Plainview, N.Y., assignor to Fairchild Camera and Instrument Corporation, a corporation of Delaware
Filed Nov. 21, 1963, Ser. No. 325,365
2 Claims. (Cl. 324—70)

This invention relates generally to the field of gyroscopes. More particularly, it relates to a detector for determining the speed of a hysteresis synchronous motor used in a gyroscope.

The small gyroscopes in widespread use today are normally sealed against contamination from dust and dirt and also to prevent the escape of internal lubricants, etc. The nature of construction of modern day gyroscopes is such that it is difficult to determine whether the motor of the gyroscope is running and, if it is running, whether it is running at the proper speed. If the gyroscope motor is not running at all then the gyroscope is completely useless and if the gyroscope motor is running at an improper speed, i.e., not at synchronous speed where a hysteresis synchronous motor is used then the scale fatcor or sensitivity of the gyroscope will not be as required and performance therefore will not be satisfactory. Of course, it is possible to test the operation of a gyroscope motor by imparting a known angular motion to the vehicle in which the gyroscope is mounted and observe the reading of the gyroscope instrument. However, in many cases it is not practical to impart motion to the vehicle solely to test the gyroscope. There are also devices presently available which electrically measure the gyroscope motor speed, however, these devices are characterized by being specifically tailored to the particular gyroscope or gyroscope type with which they are used, requiring modification of the gyroscope itself hence increasing the cost and complicating both the manufacture and repair of such gyroscopes. In addition, it would require a major amount of rework to modify existing gyros for these devices.

Accordingly, it is an object of this invention to provide a simple and reliable unit for determining the speed of a hysteresis synchronous motor when used in a gyroscope.

It is a further object of this invention to provide a speed indicator for a hysteresis synchronous gyroscope motor which requires no power and no connection to the gyroscope functioning circuitry.

Briefly stated, there is provided in accordance with the invention for use with a gyroscope of the type having a hysteresis synchronous motor a coil of wire in close proximity to the external housing of the gyroscope and means for connecting the coil to a utilization device to displace the voltage induced in the coil.

For a better understanding of the invention together with other and further objects and advantages thereof reference is had to the following description to be read in conjunction with the accompanying drawings. The scope of the invention will be pointed out with particularity in the appended claims.

Figure 1:
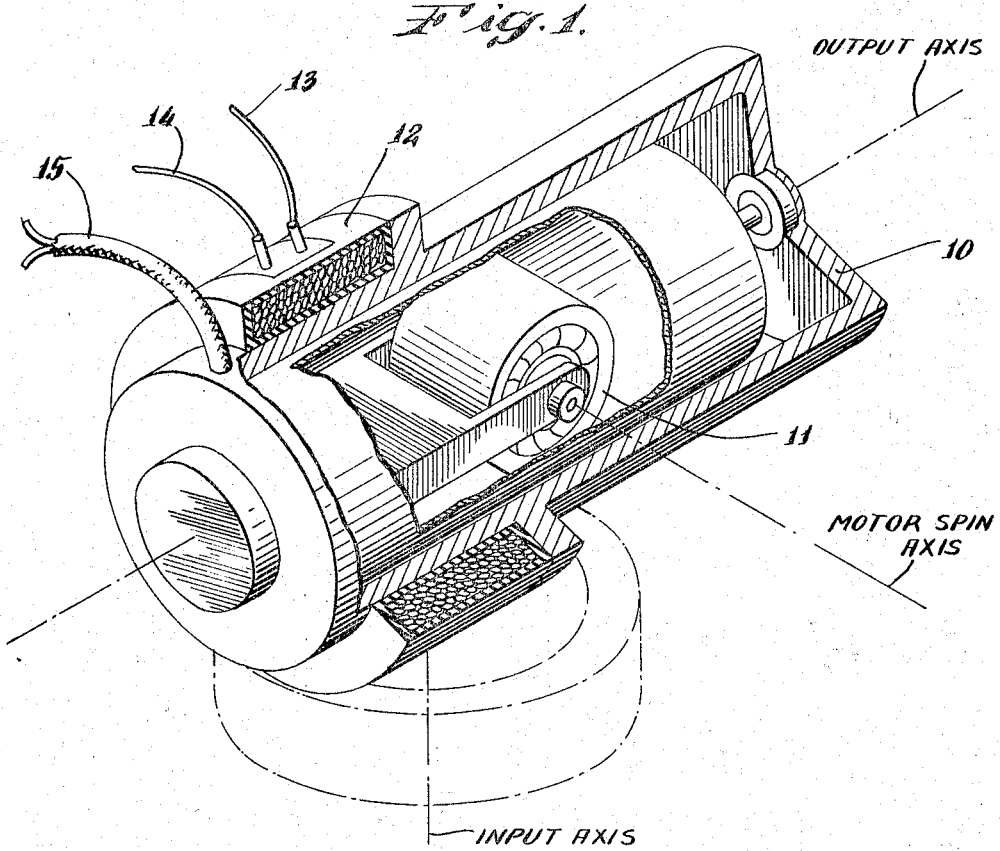
FIGURE 1 is a perspective view partially in section showing a preferred embodiment of the invention.

Referring now to FIGURE 1, a conventional gyroscope is shown having a housing 10 which is partially broken away. Within housing 10 is a conventional hysteresis synchronous motor of the type having a rotor illustrated at reference numeral 11. Since it is a feature of this invention that it is adapted to be used with any conventional gyroscope having a hysteresis synchronous motor it is believed that details of the construction of the gyroscope are unnecessary.

A pickoff coil 12 which may be formed of a number of turns of copper wire is shown, positioned about housing 10. Pickoff coil 12 has two output leads 13 and 14 associated therewith. Reference numeral 15 designates the power input to the gyroscope motor. It will be noted that no power need be supplied to coil 12 to operate the invention.

Basically, the device operates in the following manner. On initial application of an excitation voltage to the stator winding of the hysteresis synchronous motor through power input 15, a rotating magnetic field is developed. In the conventional gyroscope motor, the rotor 11 is on the outside of the stator, consequently some of the magnetic flux developed passes through the rotor, through the gyro gimbal, through the gyro gimbal cover and through the gyro housing 10 cutting the turns of pickoff coil 12. This, in turn, generates a voltage in the coil.

The stator rotating magnetic field consists of two or more poles depending upon the particular type of motor employed. This rotating field causes a like number of poles to be generated in the hysteresis material of rotor 11. These poles, generated in rotor 11, are of opposite polarity and attempt to follow the poles of the rotating magnetic field thereby developing a torque which accelerates the rotor. This is common to all hysteresis synchronous gyroscope motors.

The magnetic poles generated in rotor 11 affect the total magnetic field passing through the rotor, gimbal cover, and housing 10 and cut pickoff coil 12. There is a space phase lag of the rotor poles behind the stator poles, which phase lag decreases as speed of rotor 11 increases, becoming a minimum at synchronous speed. This means that the total magnetic flux cutting pickoff coil 12 decreases from the initial amount to a lower amount and therefore that pickoff coil 12 will have induced therein a certain voltage upon initial application of the excitation voltage applied to lead 15 which induced voltage gradually reduces to approximately ½ the initial value as rotor 11 comes up to synchronous speed. The precise values of the voltage produced by pickoff coil 12 and detectable at output leads 13 and 14 are, of course, dependent upon the particular hysteresis motor design, the design of pickoff coil 12, and the proximity of pickoff coil 12 to rotor 11. The frequency of such output signal is exactly the same as the frequency of the excitation voltage applied through input 15.

The invention as illustrated may also be used to study run-down characteristics of a gyro rotor and therefore provide information as to the bearing friction and windage losses of the motor. This is possible due to the fact that after the excitation voltage is removed from input lead 15, the rotor 11 remains magnetically polarized and the rotation of these magnetic poles will induce a voltage in pickoff coil 12. However, as the speed of rotor 11 decreases, the frequency of the magnetic field cutting pickoff 12 also decreases and therefore the output frequency is directly proportional to the rotor speed.

Figure 2:
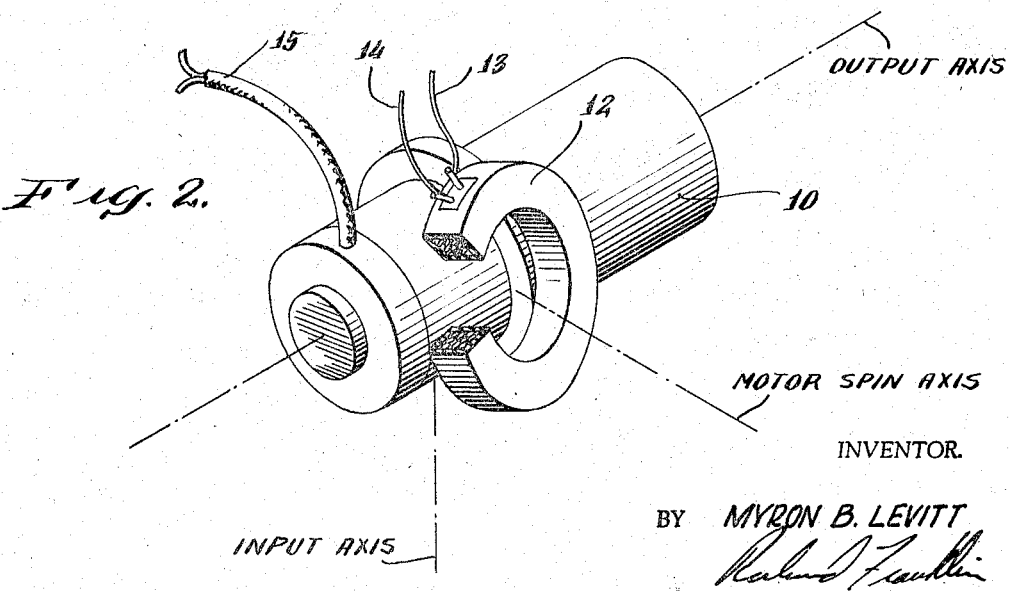
FIGURE 2 is a perspective view showing an alternate embodiment of the invention.

Referring now to FIGURE 2, which is included simply for the sake of completeness, the basic structure illustrated is identical to that shown in FIG. 1 except that pickoff coil 12 is now located adjacent housing 10 of the gyro instead of surrounding the gyro. This figure is included to illustrate that the positioning of pickoff coil 12 relative to the gyro is not critical but may, within limits, be located to suit the convenience of the user. This feature is of great importance in retro-fitting existing gyroscopes, this being possible without, in most cases, even disturbing the gyro mountings.

While what has been shown and described is believed to be the best mode and a preferred embodiment of the invention, modifications and variations can be made therein as will be clear to those skilled in the art, without departing from the spirit of the invention and consequently the scope of the invention is intended to be limited solely by the appended claims.

What is claimed is:

1. A device for detecting the speed of a gyro motor comprising a gyroscope having a housing, a hysteresis synchronous motor within said housing having a stator element and a rotor element external to said stator element which rotates when an excitation voltage is applied to said motor, and a coil of wire around said housing positioned so that when an excitation voltage is applied to said motor the magnetic fields generated by said rotor combine with the magnetic field of said stator induces in said coil of wire a voltage of the same frequency as the excitation voltage and of a magnitude proportional to the algebraic sum of said rotor and stator magnetic fields which voltage decreases as the rotor comes up to synchronous speed.

2. A device for detecting the speed of a gyro motor comprising a gyroscope having a housing, a hysteresis synchronous motor within said housing having a stator element and a rotor element external to said stator element which rotates when an excitation voltage is applied to said motor and a coil of wire located sufficiently proximate to said housing so that when an excitation voltage is applied to said motor the magnetic field generated by said rotor combined with the magnetic field of said stator induces in said coil of wire a voltage of the same frequency as the excitation voltage and of a magnitude proportional to the algebraic sum of said rotor and stator magnetic fields which voltage decreases as the rotor comes up to synchronous speed.

References Cited by the Examiner
UNITED STATES PATENTS

| | | | |
|---|---|---|---|
| 3,077,760 | 2/1963 | Packard | 74—5.6 |
| 3,188,620 | 6/1965 | MacCallum | 324—68 |
| 3,218,872 | 11/1965 | Swainson | 74—5 |

WALTER L. CARLSON, *Primary Examiner.*

M. J. LYNCH, *Assistant Examiner.*